United States Patent
He et al.

(10) Patent No.: US 8,245,501 B2
(45) Date of Patent: Aug. 21, 2012

(54) SYSTEM AND METHOD FOR CONTROLLING EXHAUST STREAM TEMPERATURE

(75) Inventors: Suhao He, Painted Post, NY (US); Achim Karl-Erich Heibel, Corning, NY (US); Wenbin Qiu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 986 days.

(21) Appl. No.: 12/229,869

(22) Filed: Aug. 27, 2008

(65) Prior Publication Data
US 2010/0050607 A1    Mar. 4, 2010

(51) Int. Cl.
*F01N 3/00* (2006.01)
*F01N 3/10* (2006.01)
*G05B 13/02* (2006.01)

(52) U.S. Cl. ............... 60/286; 60/274; 60/295; 60/297; 60/303; 700/31

(58) Field of Classification Search .............. 60/273, 60/274, 277, 286, 295, 297, 299, 303; 700/28–31; 714/774
See application file for complete search history.

(56) References Cited

U.S. PATENT DOCUMENTS

| | | | |
|---|---|---|---|
| 5,050,376 A | 9/1991 | Stiglic et al. | 60/274 |
| 5,445,019 A * | 8/1995 | Glidewell et al. | 73/114.51 |
| 5,722,236 A | 3/1998 | Cullen et al. | 60/274 |
| 6,622,480 B2 | 9/2003 | Tashiro et al. | 60/295 |
| 6,691,507 B1 | 2/2004 | Meyer et al. | 60/285 |
| 6,865,883 B2 | 3/2005 | Gomulka | 60/295 |
| 7,021,051 B2 | 4/2006 | Igarashi et al. | 60/295 |
| 7,065,959 B2 | 6/2006 | Ueno et al. | 60/295 |
| 7,111,455 B2 * | 9/2006 | Okugawa et al. | 60/295 |
| 2004/0194450 A1 | 10/2004 | Tanaka et al. | 60/285 |
| 2004/0226288 A1 * | 11/2004 | Okugawa et al. | 60/295 |
| 2005/0228572 A1 | 10/2005 | Mansbart | 701/108 |
| 2005/0284131 A1 | 12/2005 | Forthmann et al. | 60/285 |
| 2009/0158712 A1 * | 6/2009 | Tai | 60/286 |

FOREIGN PATENT DOCUMENTS

JP    2010510440 W *    4/2010
(Continued)

OTHER PUBLICATIONS

Descamps et al., English Abstract of WO 2008/062119 A1, May 29, 2008.*

(Continued)

*Primary Examiner* — Thomas Denion
*Assistant Examiner* — Audrey K Bradley
(74) *Attorney, Agent, or Firm* — Matthew B. McNutt

(57) ABSTRACT

Systems and methods are provided for controlling an exhaust stream temperature at a point along an exhaust system. The exhaust system can include an oxidation catalyst, a particulate filter having an outlet, and a fuel injector for injecting fuel into an exhaust stream at a location upstream from the outlet. An adaptive control can be provided to model a portion of the exhaust system. A fuel injection flow rate at which fuel is injected into the exhaust stream by the fuel injector can be calculated based on the adaptive control model. An operation of the fuel injector can be controlled based on the calculated fuel injection flow rate, to control the exhaust stream temperature at point along the exhaust system. A condition of the exhaust stream can also monitored and an error in the adaptive control model can be determined based on the monitored condition. The adaptive control model can also be changed to reduce the error.

23 Claims, 3 Drawing Sheets

FOREIGN PATENT DOCUMENTS

| | | |
|---|---|---|
| WO | 2005/005797 | 1/2005 |
| WO | 2008/050051 | 5/2008 |
| WO | 2008/062119 | 5/2008 |

OTHER PUBLICATIONS

Descamps et al., English Translation of JP 2010-510440 W, Apr. 2, 2010.*

P.D. Signal and P.L. Lee, "Generic Model Adaptive Control," Chemical Engineering Communications 115 (1992), pp. 35-52.

P. L. Lee and G. R. Sullivan., "Generic Model Control (GMC)," Computers Chem. Engng. 12(6), pp. 573-580. 1980.

K. Kodama, S. Hiranuma, R. Doumeki, Y. Takeda and T. Ikeda, "Development of DPF System for Commercial Vehicles (Second Report)—Active Regenerating Function in Various Driving Condition," SAE 2005-01-3694.

N. Birkby, S. Beesley, A. Hatton and H. Ei-Khatib, "The Development and Testing of an Active Particulate Regeneration System Using Model-Based Control." SAE 2006-01-3258.

* cited by examiner

SYSTEM AND METHOD FOR CONTROLLING EXHAUST STREAM TEMPERATURE

BACKGROUND

1. Field

The present disclosure relates to engine exhaust systems. More particularly, the present disclosure relates to systems and methods for controlling an exhaust stream temperature in an engine exhaust system and controlling the regeneration of a particulate filter.

2. Description of Related Art

It is known to control the temperature within a particulate filter of a diesel engine exhaust system to regenerate the filter at a desired temperature. Known control systems for controlling the temperature may operate adequately under steady-state conditions. However, such systems may not provide acceptable control performance under various dynamic conditions, such as when engine speed and/or torque are dynamically changing.

SUMMARY

In accordance with one aspect of the invention, provided is a method of controlling an exhaust stream temperature at a point along an exhaust system. The exhaust system includes an oxidation catalyst, a particulate filter including an outlet, and a fuel injector for injecting fuel into an exhaust stream at a location upstream from the outlet of the particulate filter. An adaptive control model that models a portion of the exhaust system is provided. A fuel injection flow rate at which fuel is injected into the exhaust stream by the fuel injector is calculated, based on the adaptive control model. An operation of the fuel injector is controlled based on the calculated fuel injection flow rate, to control the exhaust stream temperature at the point along the exhaust system. A condition of the exhaust stream is monitored and an error in the adaptive control model is determined based on the monitored condition. The adaptive control model is changed to reduce the error.

In accordance with a further aspect of the invention, provided is a method of controlling an exhaust stream temperature at a point along an exhaust system. The exhaust system includes a catalytic converter, a diesel particulate filter connected to the catalytic converter and located downstream from the catalytic converter, and a fuel injector for injecting fuel into an exhaust stream at a location upstream from the catalytic converter. An adaptive control model that models a portion of the exhaust system is provided, the portion including the catalytic converter. An exhaust stream temperature at the point along the exhaust system is monitored, wherein the point along the exhaust system is located between the catalytic converter and the diesel particulate filter. A target temperature for the point along the exhaust system is determined and a difference between the target temperature for the point along the exhaust system and the exhaust stream temperature at the point along the exhaust system is calculated. A controller including a proportion gain and an integral gain is provided. The controller processes the calculated difference between the target temperature for the point along the exhaust system and the exhaust stream temperature at the point along the exhaust system, to determine a time derivative of the exhaust stream temperature at the point along the exhaust system. The time derivative is provided to the adaptive control model, wherein the time derivative is a parameter of the adaptive control model. An expected temperature for the point along the exhaust system is determined based on the adaptive control model and a difference between the exhaust stream temperature at the point along the exhaust system and the expected temperature for the point along the exhaust system is calculated. An error in the adaptive control model is determined based on the difference between the exhaust stream temperature at the point along the exhaust system and the expected temperature for the point along the exhaust system. The adaptive control model is changed to reduce the error. A plurality of catalytic converter inlet conditions including oxygen concentration in the exhaust stream, mass flow rate of the exhaust stream, and temperature of the exhaust stream are monitored. Another parameter of the adaptive control model is determined based on at least one of the plurality of catalytic converter inlet conditions. A fuel injection flow rate at which fuel is injected into the exhaust stream by the fuel injector is calculated, based on the adaptive control model. An operation of the fuel injector is controlled based on the calculated fuel injection flow rate, to control the exhaust stream temperature at the point along the exhaust system.

In accordance with a further aspect of the invention, provided is a regeneration control system for an engine exhaust system. The regeneration control system includes an oxidation catalyst, and a particulate filter including an outlet. A fuel injector injects fuel into an exhaust stream at a location upstream from the outlet of the particulate filter. The exhaust stream flows through the particulate filter. A processor controls an operation of the fuel injector based on an adaptive control model that adaptively models a portion of the exhaust system. The processor is programmed to calculate a fuel injection flow rate based on the adaptive control model, control the operation of the fuel injector to control an exhaust stream temperature at a point along the exhaust system, determine an error in the adaptive control model based on a monitored condition of the engine exhaust system, and change the adaptive control model to reduce the error.

BRIEF DESCRIPTION OF THE DRAWINGS

These and other features, aspects and advantages of the present invention are better understood when the following detailed description is read with reference to the accompanying drawings, in which.

DETAILED DESCRIPTION

Figure 1:
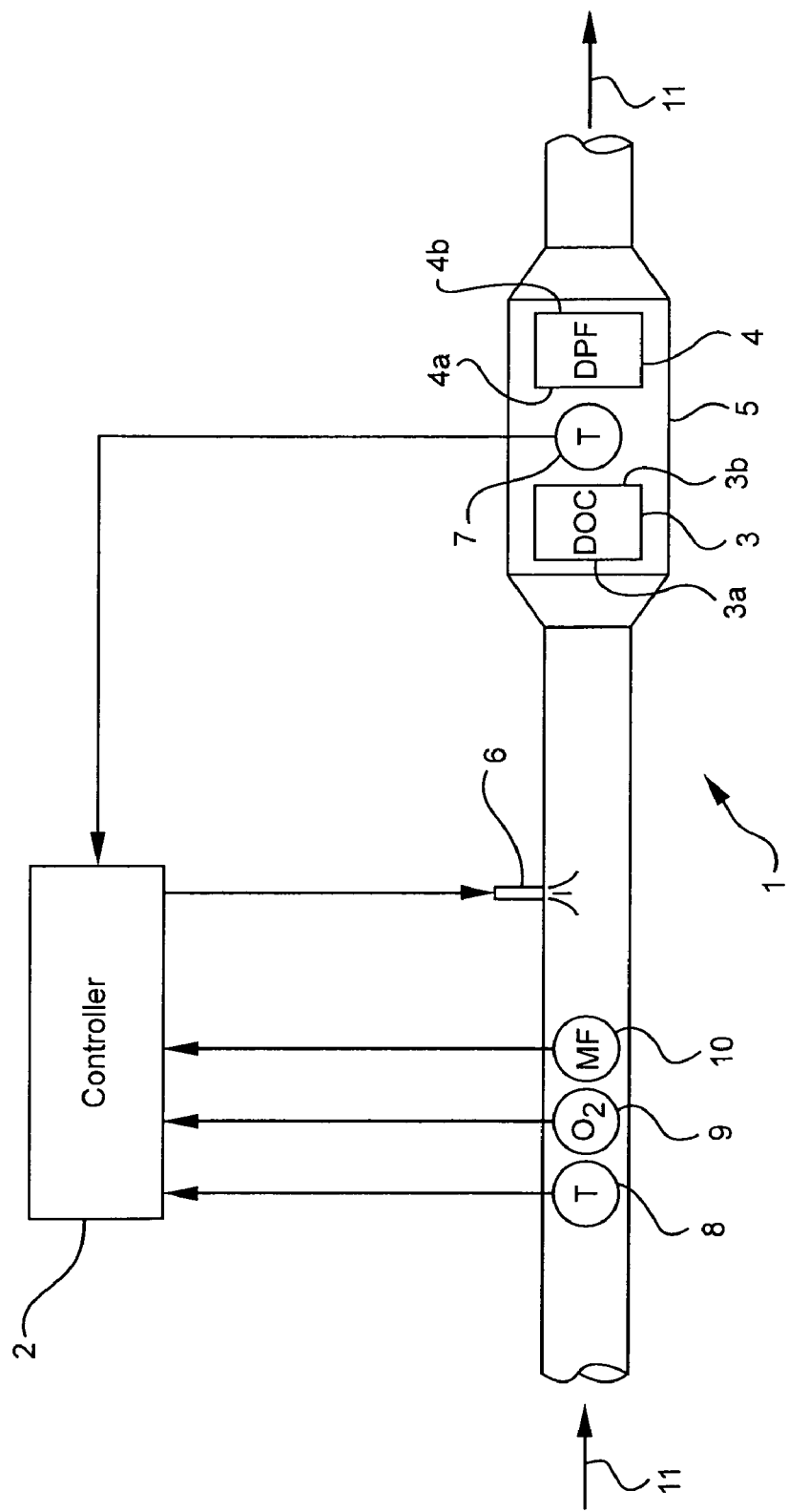
FIG. 1 is a schematic diagram of a portion of an exhaust system and a controller for the exhaust system.

Features and aspects of the present invention will now be described more fully hereinafter with reference to the accompanying drawings in which example embodiments are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Control methodologies are included in the following description. The control methodologies may reference specific portions, components, inputs or outputs of a controlled system, for purposes of explaining the control methodologies. It may be evident, however, that the control methodologies can be effectively applied to other portions, components, inputs or outputs of the controlled system. The invention is therefore not limited to particular details of this disclosure except to the extent that the claims are necessarily so limited.

FIG. 1 is a schematic diagram of a portion of an exhaust system 1 and a controller 2 for the exhaust system. The exhaust system 1 carries an exhaust stream 11 from an internal combustion engine (not shown), such as a diesel engine. It is to be appreciated that the engine need not be a diesel engine, and could be another type of internal combustion engine, such as a gasoline engine, for example. Nevertheless, the following description refers to a diesel system and controls for a diesel system for ease of explaining example embodiments, but it is understood that other (i.e., non-diesel) systems may be similarly controlled.

The exhaust system 1 includes an oxidation catalyst, which may be included within a catalytic converter, such as a diesel oxidation catalyst (DOC) 3. The exhaust system 1 further includes a particulate filter, such as a diesel particulate filter (DPF) 4 for filtering particulates from the exhaust stream 11 before the exhaust stream is discharged into the atmosphere. Various types of particulate filters may be used in accordance with the present invention. In one example, the particulate filters can comprise porous ceramic honeycomb filters.

It is useful to periodically clean out, i.e., "regenerate", the DPF 4 by removing accumulated particles that have been filtered by the DPF 4. In a diesel aftertreatment system, the DPF 4 can be regenerated by burning the accumulated particulates out of the DPF 4 by controlling the temperature of the exhaust stream 11. However, care should be taken so that the DPF 4 is not overheated to a point at which damage occurs. For example, too high of a regeneration temperature may cause cracks within the DPF 4 or reduce filtration efficiency and lifetime.

Example regeneration temperatures can be between 550° C. and 650° C., although temperatures below and above that range are also contemplated. Under normal operating conditions, the temperature of the exhaust stream 11 may not be hot enough to initiate and sustain a complete DPF regeneration. Therefore, the exhaust system 1 can include an oxidation catalyst located near the DPF 4 to heat the exhaust stream. In FIG. 1, the oxidation catalyst is shown as the DOC 3, which is located immediately upstream from the DPF 4. The DOC 3 can have an inlet 3a that is connected to the upstream exhaust system, and an outlet 3b. The outlet 3b of the DOC 3 can communicate with an inlet 4a of the DPF, which has an outlet 4b to the atmosphere. The DOC 3 and the DPF 4 may be provided within a common housing 5. It is to be appreciated that the DOC 3 and the DPF 4 may be formed as a single catalyzed filter.

In certain applications, such as heavy or light duty diesel applications, supplemental fuel can be injected. For example, a fuel injector can be provided by way of an in-cylinder injection configured to be located upstream from the DOC. In another example, as shown schematically in FIG. 1, a fuel injector 6 can be located upstream from the DOC 3 to inject fuel into the exhaust stream 11. The supplemental fuel is oxidized within the DOC 3, which heats the exhaust stream 11. The controller 2 controls the operation of the fuel injector 6 and, more specifically, the rate (e.g., mass flow rate, volumetric flow rate, etc.) at which fuel is injected in the exhaust stream 11 by the fuel injector 6. It is to be appreciated that the fuel injector 6 can be operatively connected to a fuel source, such as the fuel source of the engine.

By controlling the rate at which supplemental fuel is injected into the exhaust stream 11, the controller 2 can control the temperature of the exhaust stream downstream from the DOC 3. Therefore, the controller 2 can control regeneration temperature within the DPF 4 by controlling the operation of the fuel injector 6.

The controller 2 could implement a PID (proportional-integral-derivative) control scheme to control the fuel injector 6. However, a PID control scheme may not provide a suitable control performance under dynamic engine operating conditions, such as when engine speed and/or torque are dynamically changing. PID controllers also typically require extensive calibration to obtain desired control performance. The controller 2 could alternatively use a static mathematical model of a portion of the exhaust system 1, such as a model of the DOC 3, to calculate a desired fuel injection rate. However the static model may not be accurate initially and/or may become more inaccurate over time as the exhaust system ages. Another control alternative can use a calibrated "engine map." A calibrated engine map may require extensive engineering effort to calibrate the controller properly for all engine conditions, and may need to be repeated if the system changes (e.g., if the DPF is replaced). Another control alternative can use an adaptive control model that models a portion of the exhaust system 1 and responds to modeling errors by changing the model.

In an embodiment, the controller 2 utilizes an adaptive control model that models a portion of the exhaust system 1 including the DOC 3, determines an error in the adaptive control model itself based on a monitored condition of the exhaust system 1, and then changes the adaptive control model to reduce the error. For example, the adaptive control model may be configured to update one or more parameter values of the control model based on the monitored condition(s) of the exhaust system. The adaptive control model, and the control strategy or algorithm based thereon, are discussed in detail below. The control model applies a "feedforward+feedback" control methodology to make the controller robust under dynamic operating conditions. In one embodiment, the feedforward capability is provided by a DOC model (i.e., a model of the catalytic converter), which captures the energy balance during the hydrocarbon oxidation reaction within the DOC 3. This feedforward capability helps to reduce the impact of disturbances that are introduced by the change of multiple DOC 3 inlet conditions, such as DOC 3 inlet temperature, exhaust mass flow rate, oxygen concentration and other system conditions. The feedback control compensates for the mismatch between the DOC model and the physical system, to improve control accuracy. The controller 2 dynamically changes the adaptive control model in response to observed error in the model, to accurately control the DOC 3 outlet temperature/DPF 4 inlet temperature.

The controller 2 can be an electronic controller and may include a processor. The controller 2 can include one or more of a microprocessor, a microcontroller, a digital signal processor (DSP), an application specific integrated circuit (ASIC), a field-programmable gate array (FPGA), discrete logic circuitry, or the like. The controller 2 can further include memory and may store program instructions that cause the controller to provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The controller 2 can further include one or more analog-to-digital (A/D) converters for processing various analog inputs to the controller. The controller can also be integrated into an engine control unit (ECU).

The controller 2 can monitor one or more inputs from one or more sensors located along the exhaust system 1. A first temperature sensor 7 can obtain the temperature of the exhaust stream within or immediately downstream from the DOC 3. The controller 2 can be configured to monitor the temperature of the exhaust stream 11 that enters DPF 4 via an output from the first temperature sensor 7. A second temperature sensor 8 can also be provided to obtain the temperature of the exhaust stream 11 at a location upstream from the DOC 3. The controller 2 can be designed to monitor the exhaust stream temperature, prior to heating with the DOC 3, via the second temperature sensor 8. An oxygen sensor 9 and mass flow sensor 10 may provide the oxygen concentration of the exhaust stream 11 and mass flow of the exhaust stream, respectively, to the controller. It is to be appreciated that one or more of the conditions monitored by the controller 2 via the sensors 7-10 can be calculated or estimated by the controller, and that the sensors could be mounted at various alternative locations along the exhaust system 1.

The primary chemical reaction that occurs within the DOC 3 is:

$$HC + O_2 \rightarrow CO_2 + H_2O + Heat$$

where HC represents the hydrocarbons introduced into the exhaust stream 11 via the fuel injector 6. The heat released by the reaction raises the temperature of the exhaust stream 11 to regenerate the DPF 4.

A CSTR (Continuous Stirred Tank Reactor) model can be used to capture the thermodynamics of the primary chemical reaction. The CSTR model can be generically expressed in the following format:

$$\frac{dT_{OUT}}{dt} = f(T_{OUT\_LAST}, C_{O2}, M_{EXH}, T_{IN}, M_{HC}) \qquad (1)$$

where $T_{OUT}$ is the DOC 3 outlet temperature, $T_{OUT\_LAST}$ is the DOC 3 outlet temperature in the last (i.e. previous) control step, $C_{O2}$ is oxygen concentration in the exhaust stream 11, $M_{EXH}$ is the mass flow rate of the exhaust stream 11, $T_{IN}$ is the DOC 3 inlet temperature, and $M_{HC}$ is the injected hydrocarbon (HC) mass flow rate. It is to be appreciated from equation (1) that the rate of change of the DOC 3 outlet temperature, $dT_{OUT}/dt$, can be approximately expressed as a function of the DOC 3 outlet temperature in the last control step, $T_{OUT\_LAST}$, and the DOC 3 inlet conditions ($C_{O2}$, $M_{EXH}$, $T_{IN}$, and $M_{HC}$).

Figure 2:
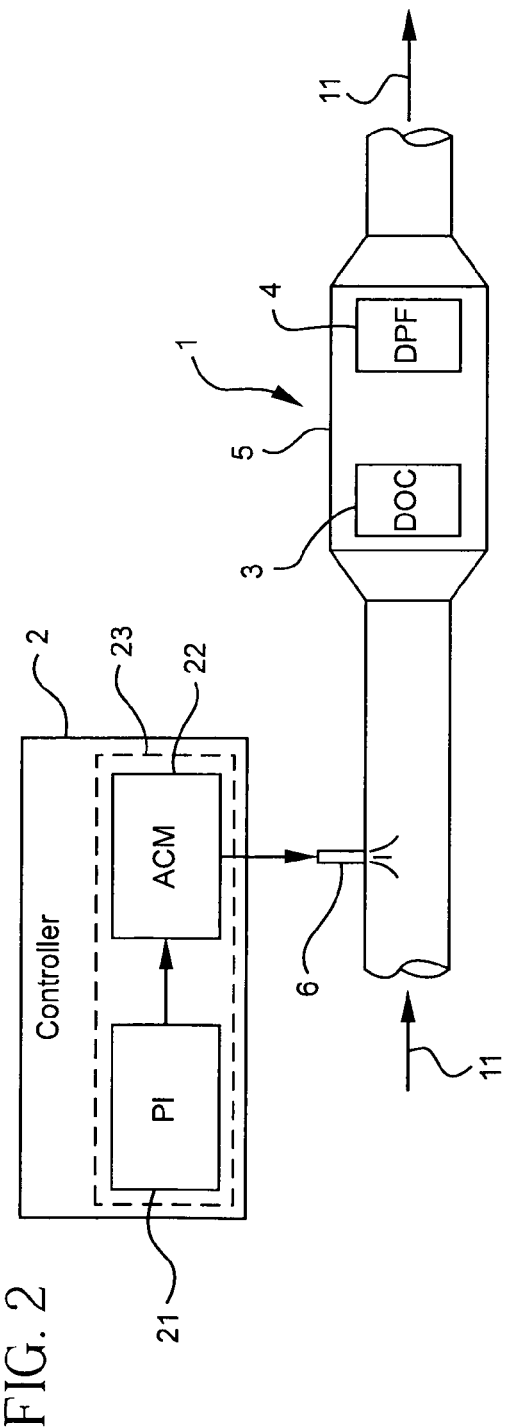
FIG. 2 is a schematic diagram of the portion of the exhaust system and the controller for the exhaust system.
Figure 3:
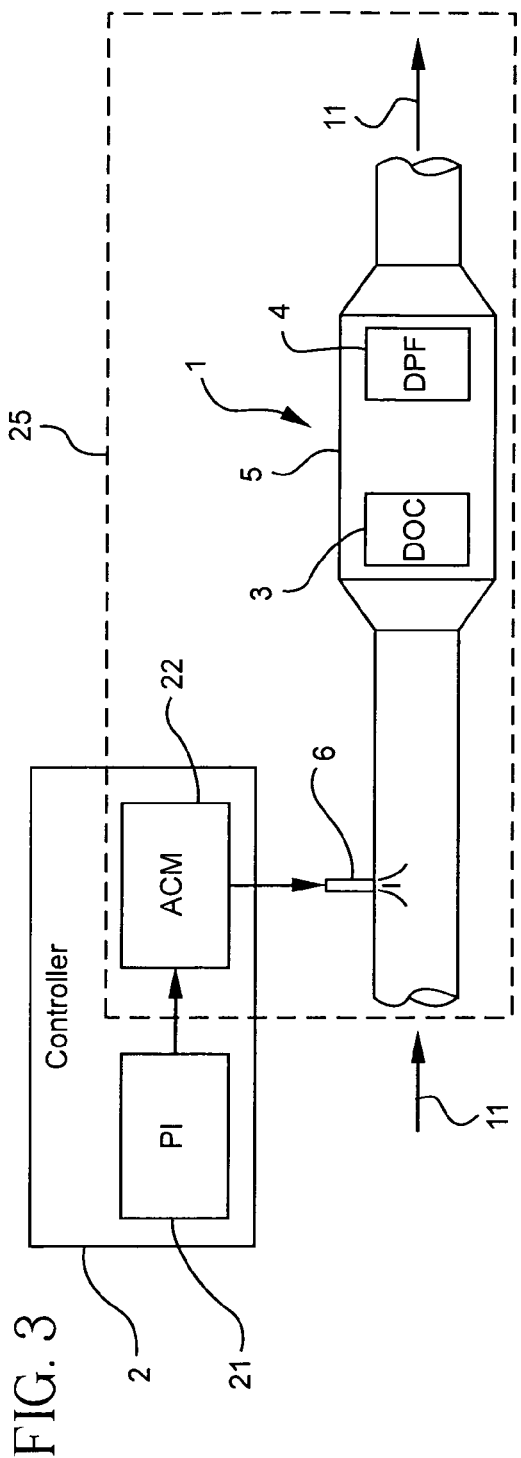
FIG. 3 is another schematic diagram of the portion of the exhaust system and the controller for the exhaust system.
Figure 4:
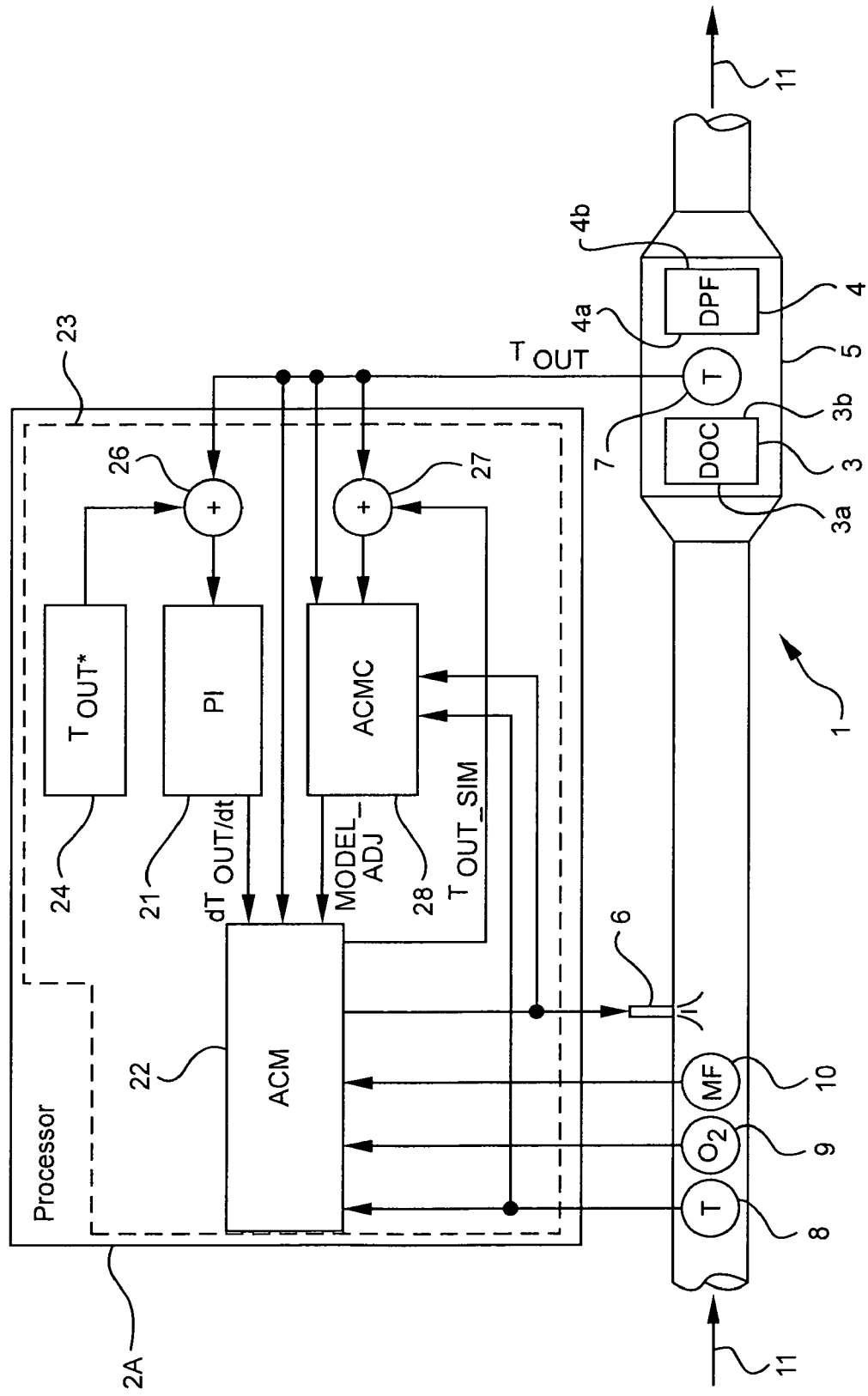
FIG. 4 is a schematic diagram of the portion of the exhaust system and a processor for the exhaust system.

In an embodiment, the controller 2 utilizes an adaptive control model to control the operation of the fuel injector 6 and, therefore, the DOC 3 outlet temperature $T_{OUT}$. The adaptive control model can be part of a "generic model control" (GMC) methodology. The GMC methodology uses an adaptive process model (e.g., an adaptive control model (ACM) 22) to approximate the dynamics of the modeled process, and a linear PI (proportional-integral) controller 21 to compensate for modeling errors and to reduce process variation caused by system disturbances. The GMC methodology is illustrated in FIGS. 2-4. The controller 2 includes a control portion having a proportional gain and an integral gain (e.g., PI controller 21) and another control portion that provides the adaptive control model 22. The PI controller 21 and the adaptive control model 22 are part of a GMC controller 23.

The operation of the exhaust system 1 is nonlinear, and the PI controller 21 alone, without the adaptive control model 22, may be unable to adequately control the regeneration temperature of the DPF 4, due to the nonlinearity of the system. However, the GMC methodology places a nonlinear process model (e.g., adaptive control model 22) of a portion of the exhaust system 1 into the control structure. For example, the adaptive control model 22 could model the nonlinear behavior of the DOC 3. The adaptive control model 22 tends to cancel the nonlinearity existing in the exhaust system 1. The approximated linear system 25 can be seen in FIG. 3. Linear control techniques can be applied to the approximated linear system 25. Example linear control techniques include PI control, PID control (proportional-integral-derivative) control, and the like.

Turning to FIG. 4, a specific embodiment of a GMC controller is shown in detail. The GMC controller 23 determines the appropriate injected hydrocarbon (HC) mass flow rate $M_{HC}$ and, therefore, controls the operation of the fuel injector 6. The injected hydrocarbon mass flow rate $M_{HC}$ is determined based on a target temperature $T_{OUT*}$ 24 for the DOC 3 outlet, the observed DOC 3 outlet temperature $T_{OUT}$, and DOC 3 inlet conditions ($C_{O2}$, $M_{EXH}$, and $T_{IN}$). A first summer 26 receives the signals $T_{OUT*}$ and $T_{OUT}$, and determines a current control error $T_{OUT*} - T_{OUT}$. The current control error $T_{OUT*} - T_{OUT}$ is an input to the PI controller 21. Based on the current control error $T_{OUT*} - T_{OUT}$ between the target temperature $T_{OUT*}$ 24 and the observed DOC 3 outlet temperature $T_{OUT}$, the PI controller 21 calculates the required time derivative of the control variable (i.e., $dT_{OUT}/dt$) for the next control step to be performed by the adaptive control model 22. The PI controller 21 calculates $dT_{OUT}/dt$ and outputs $dT_{OUT}/dt$ to the adaptive control model 22. The adaptive control model 22 determines the appropriate injected hydrocarbon mass flow rate $M_{HC}$ and outputs a corresponding control signal to the fuel injector 6.

It is to be appreciated that the PI controller 21 used in the GMC controller 23 has a different output than a PI controller found in conventional control systems. In a conventional control system, a PI controller would directly determine the manipulated variable, such as the injected hydrocarbon mass flow rate $M_{HC}$. However, in the GMC controller 23, the PI controller 21 does not output the manipulated variable (the adaptive control model 22 outputs the manipulated variable). The PI controller 21 outputs the required time derivative of the control variable $dT_{OUT}/dt$. The PI controller 21 specifies $dT_{OUT}/dt$ as follows:

$$\frac{dT_{OUT}}{dt} = K_1(T_{OUT*} - T_{OUT}) + K_2 \int (T_{OUT*} - T_{OUT}) dt \qquad (2)$$

In equation (2), the term $K_1(T_{OUT*} - T_{OUT})$ specifies that when the DOC 3 outlet temperature $T_{OUT}$ deviates from the target temperature $T_{OUT*}$ 24, the fuel injector 6 should be controlled such that $T_{OUT*}$ is approached as specified by $dT_{OUT}/dt = K_1(T_{OUT*} - T_{OUT})$. The term $K_2 \int (T_{OUT*} - T_{OUT}) dt$ specifies that the change of $dT_{OUT}/dt$ should bring the DOC 3 outlet temperature $T_{OUT}$ close to a zero offset. The primary function of the PI controller 21 is to compensate for mismatching or errors in the adaptive control model and reduce process variation caused by various system disturbances.

It is to be appreciated that values for $K_1$ and $K_2$ can be determined based on the desired operating performance of the PI controller 21. For example, values for $K_1$ and $K_2$ can be determined based on a desired shape (e.g., temperature overshoot amount) and speed of the exhaust system process response.

As stated above, the PI controller 21 calculates $dT_{OUT}/dt$ and outputs $dT_{OUT}/dt$ to the adaptive control model 22. The adaptive control model 22 models a portion of the exhaust system 1, such as the DOC 3, and controls the operation of the fuel injector 6 based on the $dT_{OUT}/dt$ signal received from the PI controller 21. The adaptive control model 22 compensates for major system disturbances caused by changing exhaust system conditions, for example, changing conditions that occur at the inlet to the DOC 3. A major system disturbance could be caused, for example, by the opening of an EGR (exhaust gas recirculation) valve. In an embodiment, the adaptive control model 22 is based on a CSTR (continuous stirred tank reactor) model of the DOC 3. A closed-form solution for the adaptive control model 22 can be determined, to calculate the injected hydrocarbon mass flow rate $M_{HC}$ as follows:

$$M_{HC} = \frac{3600 \times C_{P\_S} \times MASS_{DOC} \times \left(\frac{dT_{OUT}}{dt}\right) - C_{P\_G} \times M_{EXH} \times (T_{IN} - T_{OUT})}{MODEL\_ADJ \times (C_{P\_G} \times (T_{IN} - T_{OUT}) + \Delta H \times CONV\_EFF)} \quad (3)$$

In equation (3), the terms $C_{P\_S}$ and $C_{P\_G}$ are the substrate heat capacity of the DOC 3 and the gas heat capacity within the DOC 3, respectively, and they are functions of actual DOC 3 temperature. The term $MASS_{DOC}$ is the mass of the DOC 3. The term $dT_{OUT}/dt$ is the desired time derivative of the DOC 3 outlet temperature and is calculated according to equation (2). The term MODEL_ADJ is an adjustment factor that is used to adjust the injected hydrocarbon mass flow rate $M_{HC}$ to compensate for exhaust system 1 dynamics not captured in the adaptive control model (e.g., radiation heat loss that is not captured in the model). The term $\Delta H$ is the heat of reaction. The term CONV_EFF is the hydrocarbon conversion efficiency, which is a function of all DOC 3 inlet conditions, DOC temperature and DOC geometry.

A value for CONV_EFF can be estimated or calculated. For example, CONV_EFF can be calculated according to the following:

$$CONV\_EFF = \frac{C_{HC\_OUT} - C_{HC\_IN}}{C_{HC\_IN}} \quad (4)$$

where $C_{HC\_IN}$ and $C_{HC\_OUT}$ are respectively the input and output hydrocarbon (HC) concentration (mol/m³) of the DOC 3. The calculation of $C_{HC\_IN}$ is based on the mole balance equation, which states that: [rate of moles accumulation]= [rate of moles (in)]−[rate of moles (out)]+[rate of moles generated by the reaction]−[rate of moles consumed by the reaction]. Assuming that the reaction inside DOC 3 is a first order irreversible reaction and the reaction rate is based on the Arrhenius temperature dependence law, we obtain the following equation:

$$VEL_{GAS} \times \frac{dC_{HC}}{dx} = -r = -k_0 \times C_{HC} \times C_{02} \times \exp\left(\frac{-Ea}{R \times T_{OUT}}\right) \quad (5)$$

where $VEL_{GAS}$ is exhaust gas velocity (m/sec), $C_{HC}$ is hydrocarbon concentration (mol/m³) and x is the axis along a channel within the DOC 3. The term r is the reaction rate (1/sec), and $k_0$ is a reaction rate constant (1/((mol/m3)*sec)). The term $C_{02}$ is oxygen concentration (mol/m³). In the CSTR model, the change of oxygen concentration throughout the DOC 3 is ignored, and DOC 3 inlet condition $C_{O2}$ (from the oxygen sensor 9) is used to represent the oxygen concentration for all DOC 3 locations (inlet, internal and outlet). The term Ea is the activation energy (J/mol), R is the universal gas constant (8.3145 J/(mol·K)) and $T_{OUT}$ is the absolute DOC 3 outlet temperature (K). Taking integration on both sides of equation (5) from the DOC 3 inlet position (x=0) to the DOC outlet position (x=$LEN_{DOC}$), the following equation is obtained:

$$C_{HC\_OUT} = C_{HC\_IN} \times \exp\left[-C_{02} \times k_0 \times \frac{LEN_{DOC}}{VEL_{GAS}} \times \exp\left(\frac{-Ea}{R \times T_{OUT}}\right)\right] \quad (6)$$

Thus, $$CONV\_EFF = 1 - \exp\left[-C_{02} \times k_0 \times \frac{LEN_{DOC}}{VEL_{GAS}} \times \exp\left(\frac{-Ea}{R \times T_{OUT}}\right)\right] \quad (7)$$

The calculation of $VEL_{GAS}$ is based on the ideal gas law, PV=nRT, where P is absolute pressure (1 atm), V is the volume of the DOC 3 open space (m³), n is the number of moles, R is the universal gas constant, and "T" is equal to $T_{OUT}$, which is the absolute DOC 3 outlet temperature (K). $VEL_{GAS}$ can be calculated as follows:

$$VEL_{GAS} = \frac{\frac{dV}{dt}}{AREA\_OPEN} = \frac{\left(\frac{dn}{dt} \times R \times T_{OUT}\right)}{AREA\_OPEN} \quad (8)$$

where AREA_OPEN is the open area of the DOC 3 cross section (m²). The term dn/dt is the rate of change of the number of moles and can be calculated as follows:

$$\frac{dn}{dt} = \frac{\frac{M_{EXH}}{3600}}{MOLE\_WEIGHT} \quad (9)$$

where $M_{EXH}$ is the mass flow rate of the engine exhaust stream 11 (kg/hr) and MOLE_WEIGHT is the molecular weight (kg/mole) of the exhaust stream.

By combining equations (7), (8) and (9), CONV_EFF can be calculated and used in equation (3) to determine an appropriate injected hydrocarbon mass flow rate $M_{HC}$.

As discussed above, equation (3) includes the term MODEL_ADJ, which is an adjustment factor that is used to adjust the injected hydrocarbon mass flow rate $M_{HC}$ to compensate for exhaust system 1 dynamics not captured in the adaptive control model. MODEL_ADJ is updated dynamically based on a monitored condition or conditions of the exhaust system 1. In an embodiment, the controller 2 updates a value for MODEL_ADJ with each control step. During each control step, the controller 2 determines a model mismatch between the observed DOC 3 outlet temperature ($T_{OUT}$) and an estimated DOC 3 outlet temperature ($T_{OUT\_SIM}$). $T_{OUT\_SIM}$ is an expected DOC 3 outlet temperature and is estimated from the adaptive control model. Using the difference between $T_{OUT}$ and $T_{OUT\_SIM}$, and based on the one-step Newton iteration method, the controller 2 updates the value for MODEL_ADJ.

The updated adaptive control model with a new value for MODEL_ADJ is used to calculate/recalculate injected hydrocarbon mass flow rate $M_{HC}$.

As stated above, during each control step, a model mismatch is calculated between the observed DOC 3 outlet temperature ($T_{OUT}$) and an estimated DOC 3 outlet temperature ($T_{OUT\_SIM}$). It is to be appreciated that the estimated DOC 3 outlet temperature $T_{OUT\_SIM}$ may have a different value than the target temperature $T_{OUT*}$ 24. $T_{OUT\_SIM}$ may be calculated as follows:

$$T_{OUT\_SIM} = T_{OUT} + \frac{dT_{OUT}}{dt} \quad (10)$$

where $dT_{OUT}/dt$ is the rate of change of the observed DOC 3 outlet temperature in one control interval.

Having determined $T_{OUT\_SIM}$, a value for MODEL_ADJ can be calculated as follows:

$$MODEL\_ADJ = \quad (11)$$
$$MODEL\_ADJ\_OLD + \frac{L \times 3600 \times C_{P\_S} \times MASS_{DOC} \times (T_{OUT} - T_{OUT\_SIM})}{C_{P\_G} \times M_{HC} \times (T_{IN} - T_{OUT}) + \Delta H \times M_{HC} \times CONV\_EFF}$$

where L is an arbitrary constant coefficient for determining the speed or magnitude for updating MODEL_ADJ. Increasing the value for L will increase degree to which MODEL_ADJ is changed with each control step. However, too large a value for L may cause undesired oscillation errors for $T_{OUT}$-$T_{OUT\_SIM}$. It is to be appreciated that the new or updated value for MODEL_ADJ is calculated based on the existing value of the adjustment factor, MODEL_ADJ_OLD, which was determined and used as MODEL_ADJ during the previous control step.

The updated value for MODEL_ADJ, along with the value for CONV_EFF, are used in equation (3) to determine an appropriate injected hydrocarbon mass flow rate $M_{HC}$.

An example embodiment of a control system for controlling the operation of the fuel injector 6 and the regeneration temperature of the DPF 4 will be discussed with reference to FIG. 4. The controller can include a processor 2A for performing various calculations and providing the functionality ascribed herein to the controller. The processor 2A monitors inputs from the first temperature sensor 7 ($T_{OUT}$), the second temperature sensor 8 ($T_{IN}$), the oxygen sensor 9 ($C_{O2}$) and the mass flow sensor 10 ($M_{EXH}$). The processor 2A has an output (e.g., $M_{HC}$) for controlling the operation of the fuel injector 6.

The signal $T_{OUT}$ is provided to the adaptive control model 22, the first summer 26, a second summer 27, and an adaptive control model controller (ACMC) 28. As discussed above, the first summer receives also receives a target temperature $T_{OUT*}$ 24 for the DOC 3 outlet and determines the error $T_{OUT*}$-$T_{OUT}$. The error $T_{OUT*}$-$T_{OUT}$ is provided to the PI controller 21, which determines $dT_{OUT}/dt$. The adaptive control model 22 receives $dT_{OUT}/dt$ from the PI controller 21.

The second summer receives the signal $T_{OUT}$, and further receives $T_{OUT\_SIM}$ from the adaptive control model 22. The second summer determines $T_{OUT}$-$T_{OUT\_SIM}$, which it provides to the adaptive control model controller 28. The adaptive control model controller 28 further receives the signal $T_{IN}$, (provided by the second temperature sensor 8) and $M_{HC}$ (the injected hydrocarbon mass flow rate that is outputted by the adaptive control model 22 to control the fuel injector 6). The adaptive control model controller 28 determines a value for MODEL_ADJ, which it provides to the adaptive control model 22.

The PI controller 21, adaptive control model 22, target temperature $T_{OUT*}$ 24, first summer, second summer 27, and adaptive control model controller 28 together provide a GMC (generic model control) controller 23.

The adaptive control model 22 calculates a fuel injection flow rate at which fuel is injected into the exhaust stream 11 by the fuel injector, based on the adaptive control model. At least one parameter of the adaptive control model (e.g., MODEL_ADJ) is dynamically adjusted as the controller 2 operates, to compensate for perceived error in the control model. Therefore, the controller 2 can determine errors in its own process model and compensate for such errors by dynamically adjusting the model.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of controlling an exhaust stream temperature at a point along an exhaust system including an oxidation catalyst, a particulate filter including an outlet, and a fuel injector for injecting fuel into an exhaust stream at a location upstream from the outlet of the particulate filter, the method comprising the steps of:
   providing an adaptive control model that models a portion of the exhaust system;
   calculating a desired fuel injection flow rate at which fuel is injected into the exhaust stream by the fuel injector, based on the adaptive control model;
   controlling an operation of the fuel injector based on the calculated fuel injection flow rate, to control the exhaust stream temperature at the point along the exhaust system;
   monitoring a condition of the exhaust stream, wherein the monitored condition is a temperature of the exhaust stream at the point along the exhaust system;
   determining a target temperature for the point along the exhaust system;
   calculating a difference between the target temperature for the point along the exhaust system and the exhaust stream temperature at the point along the exhaust system;
   providing a controller including a proportion gain and an integral gain;
   processing, by the controller, the calculated difference between the target temperature for the point along the exhaust system and the exhaust stream temperature at the point along the exhaust system, to determine a time derivative of the exhaust stream temperature at the point along the exhaust system; and
   providing the time derivative to the adaptive control model;
   determining an expected temperature based on the adaptive control model;
   calculating a difference between the temperature of the exhaust stream and the expected temperature;
   determining an error in the adaptive control model based on the difference between the temperature of the exhaust stream and the expected temperature; and
   changing the adaptive control model to reduce the error.

2. The method of claim 1, wherein the oxidation catalyst includes a diesel oxidation catalyst.

3. The method of claim 1, wherein the particulate filter includes a diesel particulate filter.

4. The method of claim 1, wherein the calculated fuel injection flow rate is a mass flow rate.

5. A method of controlling an exhaust stream temperature at a point along an exhaust system including an oxidation catalyst, a particulate filter including an outlet, and a fuel injector for injecting fuel into an exhaust stream at a location upstream from the outlet of the particulate filter, the method comprising the steps of:
providing an adaptive control model that models a portion of the exhaust system;
monitoring the exhaust stream temperature at the point along the exhaust system;
determining a target temperature for the point along the exhaust system;
calculating a difference between the target temperature for the point along the exhaust system and the exhaust stream temperature at the point along the exhaust system;
providing a controller including a proportion gain and an integral gain;
processing, by the controller, the calculated difference between the target temperature for the point along the exhaust system and the exhaust stream temperature at the point along the exhaust system, to determine a time derivative of the exhaust stream temperature at the point along the exhaust system;
providing the time derivative to the adaptive control model, wherein the time derivative is a parameter of the adaptive control model;
determining an expected temperature for the point along the exhaust system based on the adaptive control model;
calculating a difference between the exhaust stream temperature at the point along the exhaust system and the expected temperature for the point along the exhaust system;
determining an error in the adaptive control model based on the difference between the exhaust stream temperature at the point along the exhaust system and the expected temperature for the point along the exhaust system;
changing the adaptive control model to reduce the error;
calculating a fuel injection flow rate at which fuel is injected into the exhaust stream by the fuel injector, based on the adaptive control model; and
controlling an operation of the fuel injector based on the calculated fuel injection flow rate, to control the exhaust stream temperature at the point along the exhaust system.

6. The method of claim 5, wherein the oxidation catalyst includes a diesel oxidation catalyst.

7. The method of claim 5, wherein the particulate filter includes a diesel particulate filter.

8. The method of claim 5, wherein the calculated fuel injection flow rate is a mass flow rate.

9. The method of claim 5, wherein the oxidation catalyst is provided in a catalytic converter that is located upstream from the particulate filter, and further wherein the portion of the exhaust system includes the catalytic converter.

10. The method of claim 9, wherein the catalytic converter has an outlet operationally connected to the particulate filter and an inlet, the method further comprising the step of:
monitoring a plurality of catalytic converter inlet conditions including oxygen concentration in the exhaust stream, mass flow rate of the exhaust stream, and temperature of the exhaust stream,
wherein the fuel injection flow rate is calculated based on at least one of the plurality of catalytic converter inlet conditions, and
wherein the fuel is injected into the exhaust stream at a location upstream from the catalytic converter.

11. The method of claim 10, wherein the fuel injection flow rate is calculated based on a formula:

$$M_{HC} = \frac{3600 \times C_{P\_S} \times \text{MASS}_{DOC} \times \left(\frac{dT_{OUT}}{dt}\right) - C_{P\_G} \times M_{EXH} \times (T_{IN} - T_{OUT})}{\text{MODEL\_ADJ} \times (C_{P\_G} \times (T_{IN} - T_{OUT}) + \Delta H \times \text{CONV\_EFF})};$$

and wherein the error in the adaptive control model is determined based on a formula:

$$\text{MODEL\_ADJ} = \text{MODEL\_ADJ\_OLD} + \frac{L \times 3600 \times C_{P\_S} \times \text{MASS}_{DOC} \times (T_{OUT} - T_{OUT\_SIM})}{C_{P\_G} \times M_{HC} \times (T_{IN} - T_{OUT}) + \Delta H \times M_{HC} \times \text{CONV\_EFF}},$$

where $M_{HC}$ is the fuel injection flow rate, $C_{P\_S}$ is a substrate heat capacity, $\text{MASS}_{DOC}$ is a mass of the catalytic converter, $T_{OUT}$ is the exhaust stream temperature at the point along the exhaust system, $C_{P\_G}$ is a gas heat capacity, $M_{EXH}$ is the mass flow rate of the exhaust stream, $T_{IN}$ is the temperature of the exhaust stream at the catalytic converter inlet, MODEL_ADJ is an adjustment parameter, $\Delta H$ is a heat of reaction, CONV_EFF is a conversion efficiency, MODEL_ADJ_OLD is another adjustment factor, L is an arbitrary coefficient, and $T_{OUT\_SIM}$ is the expected temperature for the point along the exhaust system.

12. A method of controlling an exhaust stream temperature at a point along an exhaust system including a catalytic converter, a diesel particulate filter operationally connected to the catalytic converter and located downstream from the catalytic converter, and a fuel injector for injecting fuel into an exhaust stream at a location upstream from the catalytic converter, the method comprising the steps of:
providing an adaptive control model that models a portion of the exhaust system, the portion including the catalytic converter;
monitoring the exhaust stream temperature at the point along the exhaust system, wherein the point along the exhaust system is located between the catalytic converter and the diesel particulate filter;
determining a target temperature for the point along the exhaust system;
calculating a difference between the target temperature for the point along the exhaust system and the exhaust stream temperature at the point along the exhaust system;
providing a controller including a proportion gain and an integral gain;
processing, by the controller, the calculated difference between the target temperature for the point along the exhaust system and the exhaust stream temperature at the point along the exhaust system, to determine a time derivative of the exhaust stream temperature at the point along the exhaust system;

providing the time derivative to the adaptive control model, wherein the time derivative is a parameter of the adaptive control model;

determining an expected temperature for the point along the exhaust system based on the adaptive control model;

calculating a difference between the exhaust stream temperature at the point along the exhaust system and the expected temperature for the point along the exhaust system;

determining an error in the adaptive control model based on the difference between the exhaust stream temperature at the point along the exhaust system and the expected temperature for the point along the exhaust system;

changing the adaptive control model to reduce the error;

monitoring a plurality of catalytic converter inlet conditions including oxygen concentration in the exhaust stream, mass flow rate of the exhaust stream, and temperature of the exhaust stream;

determining another parameter of the adaptive control model based on at least one of the plurality of catalytic converter inlet conditions;

calculating a fuel injection flow rate at which fuel is injected into the exhaust stream by the fuel injector, based on the adaptive control model; and controlling an operation of the fuel injector based on the calculated fuel injection flow rate, to control the exhaust stream temperature at the point along the exhaust system.

13. A regeneration control system for an engine exhaust system, comprising:

an oxidation catalyst;

a particulate filter including an outlet;

a fuel injector for injecting fuel into an exhaust stream at a location upstream from the outlet of the particulate filter, wherein the exhaust stream flows through the particulate filter; and a processor for controlling an operation of the fuel injector based on an adaptive control model that adaptively models a portion of the exhaust system, wherein the processor is programmed to:

calculate a desired fuel injection flow rate based on the adaptive control model, control the operation of the fuel injector to control an exhaust stream temperature at a point along the exhaust system, determine an expected temperature, calculate a difference between a temperature of the exhaust stream and the expected temperature, determine an error in the adaptive control model based on the difference between the temperature of the exhaust stream and the expected temperature, and change the adaptive control model to reduce the error; and a first temperature sensor for sensing a temperature at the point along the exhaust system, wherein the processor is further programmed to:

calculate a difference between the temperature at the point along the exhaust system and a target temperature for the point along the exhaust system, and process the calculated difference between the temperature at the point along the exhaust system and the target temperature for the point along the exhaust system using a control algorithm including a proportional gain setting and an integral gain setting, to determine a time derivative of the exhaust stream temperature at the point along the exhaust system, wherein the time derivative of the exhaust stream temperature at the point along the exhaust system is a parameter of the adaptive control model.

14. The regeneration control system of claim 13, wherein the oxidation catalyst includes a diesel oxidation catalyst.

15. The regeneration control system of claim 13, wherein the particulate filter includes a diesel particulate filter.

16. The regeneration control system of claim 13, wherein the fuel injection flow rate is a mass flow rate.

17. The regeneration control system of claim 13, wherein the oxidation catalyst is provided in a catalytic converter that is located upstream from the particulate filter, and further wherein the portion of the exhaust system that is modeled by the adaptive control model includes the catalytic converter.

18. A regeneration control system for an engine exhaust system, comprising:

a particulate filter including an outlet;

an oxidation catalyst provided in a catalytic converter that is located upstream from the particulate filter;

a fuel injector for injecting fuel into an exhaust stream at a location upstream from the outlet of the particulate filter, wherein the exhaust stream flows through the particulate filter;

a first temperature sensor for sensing an exhaust stream temperature at a point along the exhaust system; and a processor for controlling an operation of the fuel injector based on an adaptive control model that adaptively models a portion of the exhaust system including the catalytic converter, wherein the processor is programmed to:

calculate a difference between the exhaust stream temperature at the point along the exhaust system and a target temperature for the point along the exhaust system, process the calculated difference between the exhaust stream temperature at the point along the exhaust system and the target temperature for the point along the exhaust system using a control algorithm including a proportional gain setting and an integral gain setting, to determine a time derivative of the exhaust stream temperature at the point along the exhaust system, wherein the time derivative of the exhaust stream temperature at the point along the exhaust system is a parameter of the adaptive control model, determine an expected temperature for the point along the exhaust system, calculate a difference between the exhaust stream temperature at the point along the exhaust system and the expected temperature for the point along the exhaust system, determine an error in the adaptive control model based on the difference between the exhaust stream temperature at the point along the exhaust system and the expected temperature for the point along the exhaust system, change the adaptive control model to reduce the error, calculate a fuel injection flow rate based on the adaptive control model, and control the operation of the fuel injector to control the exhaust stream temperature at the point along the exhaust system.

19. The regeneration control system of claim 18, wherein the oxidation catalyst includes a diesel oxidation catalyst.

20. The regeneration control system of claim 18, wherein the particulate filter includes a diesel particulate filter.

21. The regeneration control system of claim 18, wherein the fuel injection flow rate is a mass flow rate.

22. The regeneration control system of claim 18, wherein the catalytic converter has an outlet operationally connected to the particulate filter and an inlet, the control system further comprising:
- a second temperature sensor for sensing temperature of the exhaust stream at the inlet;
- an oxygen sensor for sensing oxygen concentration in the exhaust stream at the inlet; and
- a mass flow sensor for sensing a mass flow rate of the exhaust stream at the inlet,
- wherein the fuel injection flow rate is calculated based on the temperature of the exhaust stream at the inlet, the oxygen concentration in the exhaust stream at the inlet, and the mass flow rate of the exhaust stream at the inlet, and
- wherein the fuel is injected into the exhaust stream at a location upstream from the catalytic converter.

23. The regeneration control system of claim 22, wherein the fuel injection flow rate is calculated based on a formula:

$$M_{HC} = \frac{3600 \times C_{P\_S} \times MASS_{DOC} \times \left(\frac{dT_{OUT}}{dt}\right) - C_{P\_G} \times M_{EXH} \times (T_{IN} - T_{OUT})}{MODEL\_ADJ \times (C_{P\_G} \times (T_{IN} - T_{OUT}) + \Delta H \times CONV\_EFF)};$$

and wherein the error in the adaptive control model is determined based on a formula:

$$MODEL\_ADJ = MODEL\_ADJ\_OLD + \frac{L \times 3600 \times C_{P\_S} \times MASS_{DOC} \times (T_{OUT} - T_{OUT\_SIM})}{C_{P\_G} \times M_{HC} \times (T_{IN} - T_{OUT}) + \Delta H \times M_{HC} \times CONV\_EFF},$$

where $M_{HC}$ is the fuel injection flow rate, $C_{P\_S}$ is a substrate heat capacity, $MASS_{DOC}$ is a mass of the catalytic converter, $T_{OUT}$ is the exhaust stream temperature at the point along the exhaust system, $C_{P\_G}$ is a gas heat capacity, $M_{EXH}$ is the mass flow rate of the exhaust stream, $T_{IN}$ is the temperature of the exhaust stream at the inlet, MODEL_ADJ is an adjustment parameter, $\Delta H$ is a heat of reaction, CONV_EFF is a conversion efficiency, MODEL_ADJ_OLD is another adjustment factor, L is an arbitrary coefficient, and $T_{OUT\_SIM}$ is the expected temperature at the point along the exhaust system.

* * * * *